United States Patent [19]

Haider et al.

[11] 4,338,635

[45] Jul. 6, 1982

[54] CATHODE RAY TUBE MONITOR

[75] Inventors: Francis J. Haider, Circle Pines; Allen R. Kent, Arden Hills, both of Minn.

[73] Assignee: Audiotronics Video Display Division, Inc., New Brighton, Minn.

[21] Appl. No.: 155,938

[22] Filed: Jun. 3, 1980

[51] Int. Cl.³ .............................................. H04N 5/64
[52] U.S. Cl. .................................................. 358/254
[58] Field of Search ...................... 358/254, 229, 217; 455/347

[56] References Cited

U.S. PATENT DOCUMENTS

| | | | |
|---|---|---|---|
| 2,936,448 | 5/1960 | Marholz | 358/254 |
| 3,119,900 | 1/1964 | Gray et al. | 358/254 |
| 3,139,485 | 6/1964 | Gray et al. | 358/254 |
| 3,944,892 | 3/1976 | Johnson et al. | 358/254 |
| 4,037,256 | 7/1977 | Costa | 358/254 |
| 4,101,933 | 7/1978 | Richmond et al. | 358/254 |

*Primary Examiner*—Richard Murray
*Attorney, Agent, or Firm*—Kinney, Lange, Braddock, Westman and Fairbairn

[57] ABSTRACT

A cathode ray tube monitor includes a cathode ray tube having a printed circuit board mounted to and supported by the cathode ray tube. A mounting ring or collar is attached to the rear surface of the cathode ray tube at the transition between the neck portion and the bell portion of the tube. The printed circuit board has an aperture therein to permit coaxial alignment of the printed circuit board with the neck portion of the cathode ray tube. The printed circuit board is connected to and supported by the mounting ring or collar.

23 Claims, 9 Drawing Figures

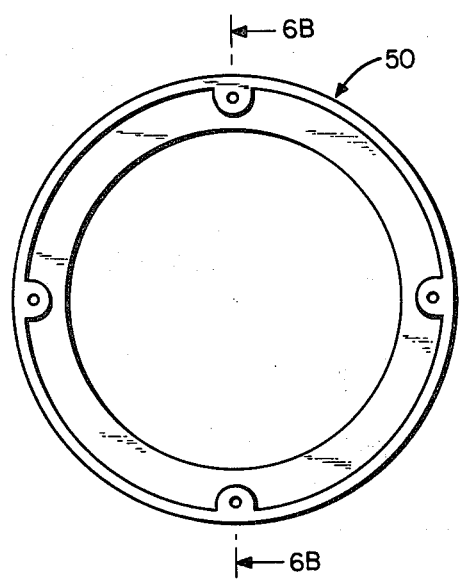
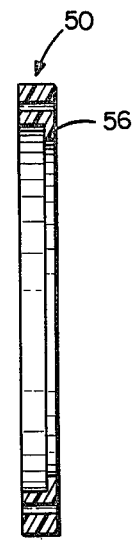
FIG. 6A  FIG. 6B
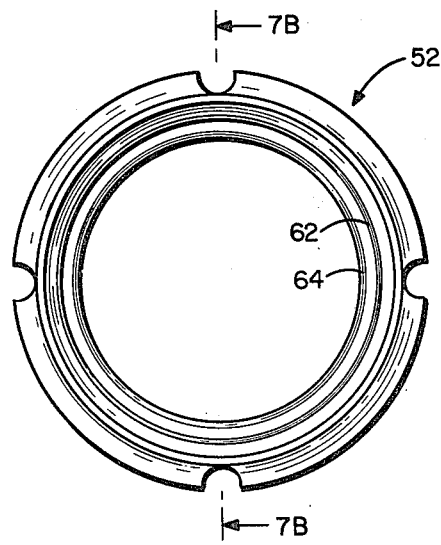
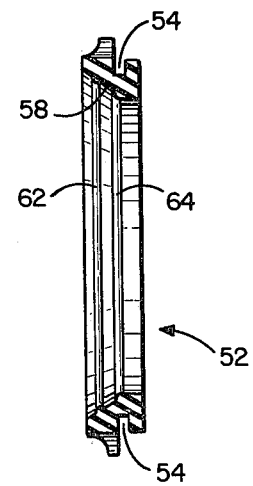
FIG. 7A  FIG. 7B

CATHODE RAY TUBE MONITOR

BACKGROUND OF THE INVENTION

1. Field of the Invention

The present invention relates to cathode ray tube monitors. In particular, the present invention is a cathode ray tube monitor in which a circuit board containing control circuitry for the cathode ray tube is attached to a mounting ring or collar which in turn is bonded to a back surface of the cathode ray tube.

2. Description of the Prior Art

Cathode ray tube (CRT) monitors are successfully used in a wide variety of applications, including conventional television, displays for computers, and a wide variety of other industrial, scientific and medical applications. Conventional CRT monitors include a cathode ray tube and drive circuitry which is mounted on a chassis. With advances in electronics, the size of many of the components of the drive circuitry of CRT monitors has been significantly reduced. Despite these improvements in the drive circuitry, very few attempts have been made to mount drive circuitry in any other fashion but the conventional chassis.

The Marholz U.S. Pat. No. 2,936,448, the Gray et al U.S. Pat. Nos. 3,119,900 and 3,139,485 and the Johnson et al U.S. Pat. No. 3,944,892 each show CRT monitors in which the circuit board containing drive circuitry is mounted coaxially over the neck of a cathode ray tube. While this provides somewhat more compact structure, all the patents require relatively complex mounting of the circuit board with straps, braces or the like. As a result, the advantages of eliminating the conventional chassis are not fully achieved by the devices of these patents.

The Marholz U.S. Pat. No. 2,936,448 shows a cylinder circumferentially placed around the neck portion of the cathode ray tube. Straps fixedly attached to the cylinder extend forward around the cathode ray tube to the front and are attached to an escutcheon by screws, thus holding the cylinder in place around the neck portion. This method is inconvenient for both original assembly and repair, since it requires four strips to secure the cylinder and each strap must be attached at one end to the cylinder and at the other to the escutcheon, requiring eight points of attachment.

The Gray et al U.S. Pat. Nos. 3,139,485 and 3,119,900 each show a circuit board apparently mounted around the neck portion of a cathode ray tube. The circuit boards are, however, also attached to a strap around the front portion of the cathode ray tube and to a support member comprising the bottom wall of a television cabinet. The Gray et al patents, like the Marholz patent, require several points of attachment for stable mounting of the circuit board.

The Johnson et al U.S. Pat. No. 3,944,892 shows a CRT display in which a rear circuit board 46 is mounted over the neck of the cathode ray tube. This rear circuit board is supported by side circuit boards which extend forward from the rear circuit board and parallel to the axis of the neck of the tube. The rear and side circuit boards form a box-like assembly surrounding the cathode ray tube with the side circuit boards being attached to the escutcheon by a rod. This arrangement is costly to manufacture and difficult to repair.

SUMMARY OF THE INVENTION

The present invention is an improved cathode ray tube (CRT) monitor. In the present invention, a mounting ring or collar is fixedly attached to the back surface of a cathode ray tube near the junction of the neck portion and the bell portion of the cathode ray tube. A circuit board is attached to and supported by the mounting collar. The circuit board has an aperture which permits the circuit board to be mounted to the mounting collar without interference with the neck portion of the cathode ray tube.

BRIEF DESCRIPTION OF THE DRAWINGS

FIGS. 6A and 6B are front and sectional views of the plastic collar of FIG. 5.

FIGS. 7A and 7B are front and sectional views of the resilient grommet of FIG. 5.

DETAILED DESCRIPTION OF THE PREFERRED EMBODIMENTS

Figure 1:
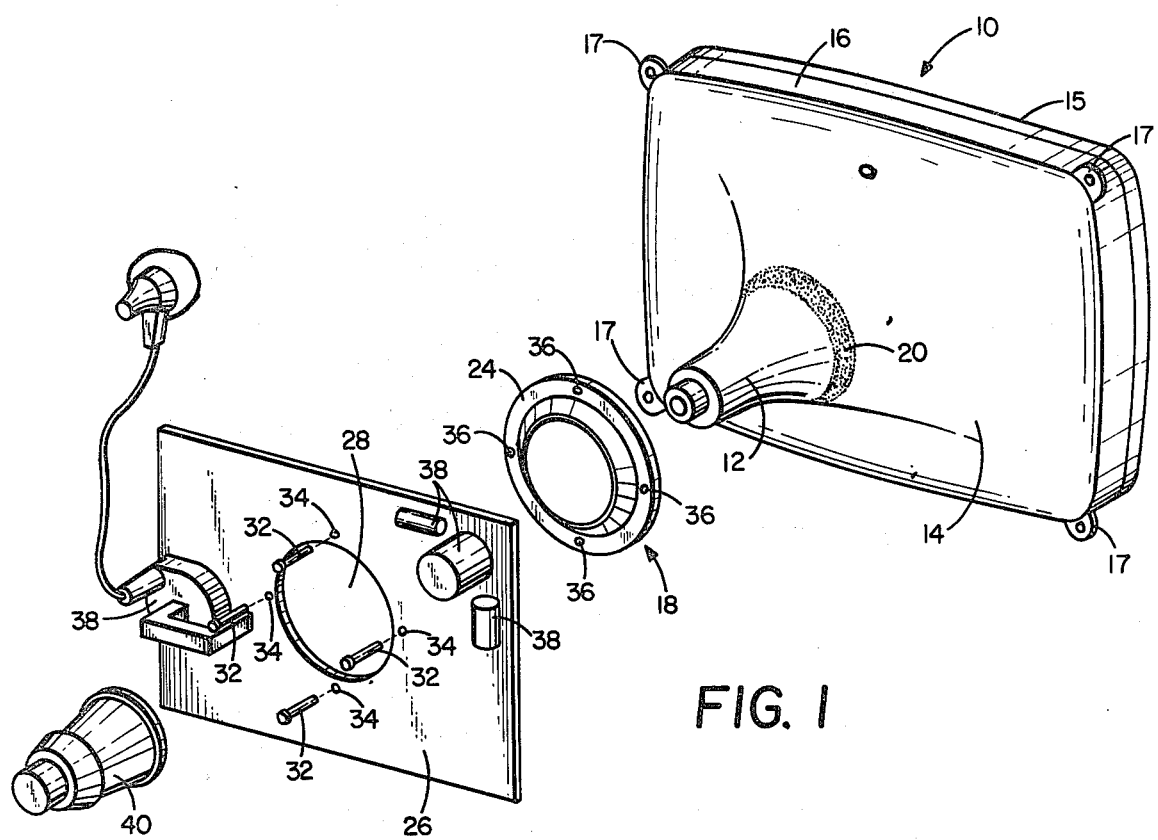
FIGS. 1 and 2 are exploded and assembled perspective views showing a preferred embodiment of the cathode ray tube monitor of the present invention.
Figure 2:
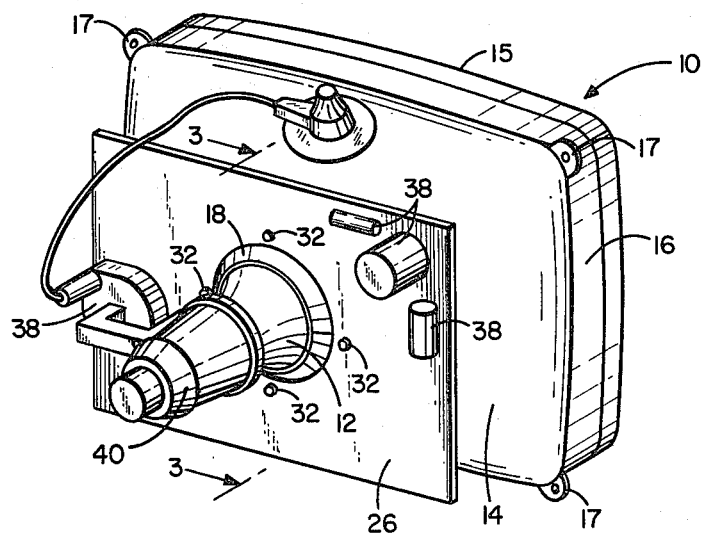
Figure 3:
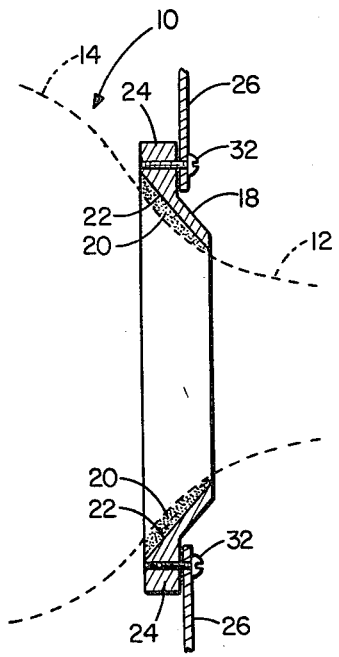
FIG. 3 is a sectional view along section 3—3 of FIG. 2.

A preferred embodiment of the cathode ray tube monitor of the present invention is shown in exploded, assembled, and sectional views in FIGS. 1, 2 and 3, respectively. Cathode ray tube 10 has a neck portion 12, a bell portion 14, and a front face 15. Metal strip 16 surrounds the outer edge of bell portion 14 and has metal mounting tabs 17 at each corner to permit mounting of the cathode ray tube 10 in a suitable cabinet.

CRT 10 shown in FIGS. 1–3 is of the "rectangular" type. It should be understood, however, that the present invention is applicable to other types and sizes of CRT's as well.

In the embodiment shown in FIGS. 1–3, mounting ring or collar 18 is fixedly attached to the backside of CRT 10 by adhesive bonding material 20. Mounting collar 18 has an inner diameter which is narrowest at its most rearward position and which increases toward the front of the collar, thereby defining an inner surface 22 which generally conforms to the surface of CRT 10 at the junction between neck portion 12 and bell portion 14.

At its outer edge, collar 18 has a flange portion 24 to which printed circuit board 26 is attached. Circuit board 26 has an aperture 28 in its center to permit mounting of printed circuit board 26 coaxially with neck portion 12, with the plane defined by printed circuit board 26 being generally perpendicular to the central axis of neck portion 12. Aperture 28 has a diameter which is larger than the diameter of neck portion 12 and is smaller than the outer diameter of flange portion 24 of collar 18.

Circuit board 26 is fastened to collar 18 by screws 32. In the particular embodiment illustrated in FIGS. 1–3, screws 32 are installed through holes 34 in circuit board 26 and into threaded mounting holes 36 in flange portion 24 of collar 18. Other suitable connecting means may, however, be used to connect circuit board 26 to collar 18 in accordance with the teaching of the present invention.

Electrical components 38 for driving CRT 10 are mounted on printed circuit board 26. Deflection yoke 40 is mounted on neck 12 to the rear of printed circuit board 26. In the preferred embodiments shown in FIGS. 1-3, both circuit board 26 and yoke 40 are easily detachable, thereby making all components of the CRT monitor easily accessible for service.

In the preferred embodiments of the present invention, collar 18 has sufficient structural strength to support printed circuit board 26. In the embodiments shown in FIGS. 1-3, collar 18 is preferably a molded plastic or hard rubber material.

Due to the differences in coefficient of thermal expansion of the material forming collar 18 and the glass forming CRT 10, adhesive material 20 is preferably a resilient bonding material such as hot melt glue or silicone rubber adhesive. In the embodiments in which collar 18 is a hard rubber material, the resilience of the hard rubber accommodates some differences in coefficient of thermal expansion, and permits other bonding materials with less resiliency to be used.

Figure 4:
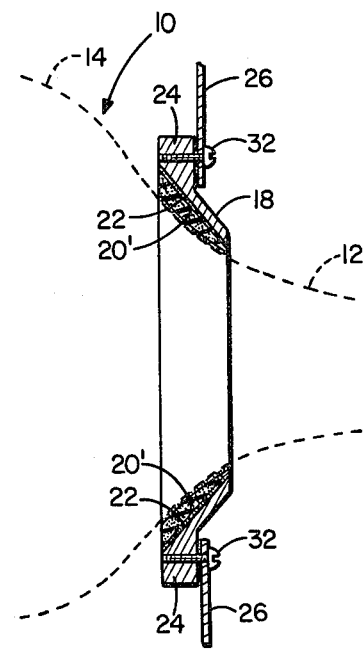
FIG. 4 is a sectional view showing another embodiment of the present invention in which the mounting collar is bonded to the CRT by a foamed tape with adhesive on both sides.
Figure 5:
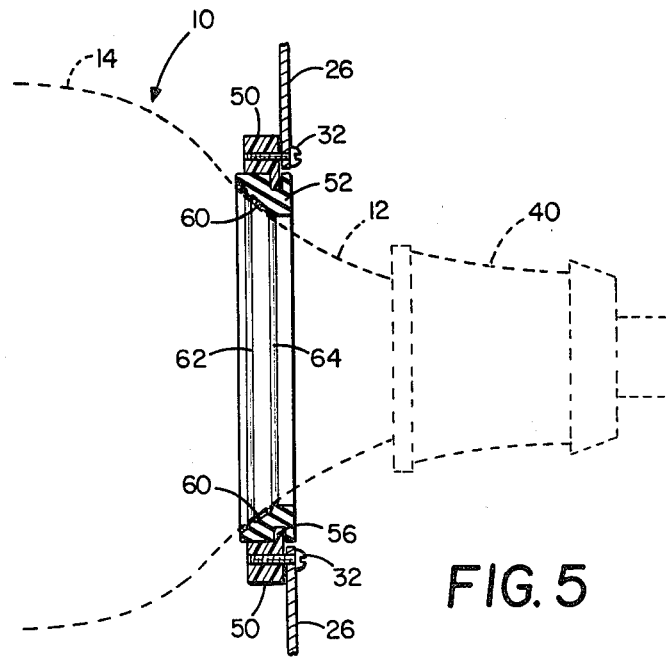
FIG. 5 is a sectional view showing still another embodiment of the present invention in which a composite collar formed by a resilient grommet and a plastic collar is used.

FIG. 4 is a sectional view showing another embodiment of the present invention which is generally similar to the embodiments shown in FIGS. 1-3. The same reference numerals are used to designate similar elements. As shown in FIG. 4, collar 18 is preferably bonded to CRT 10 by a resilient plastic tape 20' having adhesive on both sides. In the preferred embodiment, the resilient tape is a foamed plastic material.

FIGS. 5, 6A, 6B, 7A and 7B illustrate another preferred embodiment of the present invention, in which the mounting collar is a composite device formed by molded plastic ring 50 and molded rubber grommet 52. In this embodiment, molded plastic ring 50 provides a mounting flange of the structural strength and stability required for mounting and supporting printed circuit board 26. Grommet 52 provides a CRT engaging portion of the resiliency necessary to compensate for differences in coefficients of thermal expansion between the glass of CRT 10 and molded plastic ring 50. As shown in FIGS. 5-7B, grommet 52 has a groove 54 which mates with lip 56 on the inner surface of ring 50. Grommet 52 is held in position within ring 50, and has an inner surface 58 which generally conforms to the rear surface of CRT 10 near the junction of neck 12 and bell 14. Bonding means 60 bonds grommet 52 to CRT 10. Bonding means 60 is preferably a silicone rubber adhesive, hot melt glue, foamed plastic tape having adhesive on both sides, or other suitable bonding adhesive.

In the preferred embodiment illustrated in FIGS. 5-7B, grommet 52 also preferably includes ridges 62 and 64 which extend circumferentially around the inner surface 58. Ridges 62 and 64 ensure a reliable mating of grommet 52 to the surface of CRT 10.

In conclusion, the present invention is a low cost, readily serviceable CRT monitor which eliminates the customary metal chassis components of prior art CRT monitors. The present invention is easily attachable to the user's enclosure by means of screws through the CRT mounting ears 17. No further mounting of components is necessary, since electrical components are carried on circuit board 26, which is connected to mounting collar 18, which in turn is bonded to CRT 10.

Although the present invention has been described with reference to preferred embodiments, workers skilled in the art will recognize that changes may be made in form and detail without departing from the spirit and scope of the invention.

What is claimed is:

1. Mounting apparatus for mounting a circuit board to a cathode ray tube having a front face and a back surface with a bell portion and a neck portion, the mounting apparatus comprising:
    a mounting collar;
    attaching means proximate a transition between the neck portion and the bell portion for fixedly attaching the mounting collar to the back surface of the cathode ray tube; and
    connecting means for connecting the circuit board to the mounting collar.

2. The apparatus of claim 1 wherein the mounting collar at least partially surrounds the neck portion.

3. The apparatus of claim 2 wherein the mounting collar has a tube engaging portion having an inner surface generally conforming to the back surface of the cathode ray tube proximate the transition between the neck portion and the bell portion, and a circuit board supporting flange portion to which the circuit board is connected by the connecting means.

4. The apparatus of claim 3 wherein the flange portion generally surrounds the tube engaging portion and extends around the outer periphery of the mounting collar.

5. The apparatus of claim 3 wherein the circuit board has an aperture therein to permit coaxial alignment of the circuit board with the neck portion of the cathode ray tube, and wherein the connecting means connects the circuit board to the flange portion with the circuit board oriented generally perpendicular to a central axis of the neck portion.

6. The apparatus of claim 5 wherein the connecting means comprises threaded fasteners for fastening the circuit board to the flange portion and at a plurality of spaced locations.

7. The apparatus of claim 3 wherein the flange portion comprises a substantially rigid ring, and wherein the tube engaging portion comprises a resilient grommet mounted within the flange portion.

8. The apparatus of claim 7 wherein the resilient grommet is a molded rubber grommet, and wherein the flange portion is a molded plastic ring.

9. The apparatus of claim 1 wherein the attaching means comprises resilient bonding material.

10. The apparatus of claim 9 wherein the resilient bonding material comprises a hot melt glue.

11. The apparatus of claim 9 wherein the resilient bonding material comprises a silicone rubber adhesive.

12. The apparatus of claim 9 wherein the resilient bonding material comprises a resilient foamed plastic tape having adhesive on its major surfaces.

13. The apparatus of claim 1 wherein the mounting collar is a molded plastic ring.

14. The apparatus of claim 1 wherein the mounting collar is a molded hard rubber ring.

15. Mounting apparatus for mounting a circuit board to a cathode ray tube having a front face and a back surface with a bell portion and a neck portion, the mounting apparatus comprising:
    a mounting collar positioned to circumferentially surround at least a portion of the neck portion;

attaching means in cooperative relationship with an inner surface of the mounting collar and the back surface of the cathode ray tube for fixedly attaching the inner surface of the mounting collar to the back surface of the cathode ray tube; and connecting means for connecting the circuit board to the mounting collar.

16. The apparatus of claim 15 wherein the mounting collar has an inner surface generally conforming to a back surface of the cathode ray tube and has a flange portion to which the circuit board is connected by the connecting means.

17. The apparatus of claim 16 wherein the mounting collar comprises a substantially rigid ring.

18. The apparatus of claim 17 wherein the mounting collar further comprises a resilient grommet mounted within the substantially rigid ring, the resilient grommet having the inner surface generally conforming to the back surface of the cathode ray tube, and the substantially rigid ring having the flange portion.

19. The apparatus of claim 16 wherein the circuit board has an aperture therein to permit coaxial alignment of the circuit board with the neck portion of the cathode ray tube, and wherein the connecting means connects the circuit board to the flange portion with the circuit board oriented generally perpendicular to a central axis of the neck portion.

20. The apparatus of claim 15 wherein the bonding means comprises a resilient bonding material.

21. A method of mounting a circuit board to a cathode ray tube comprising:

placing a mounting ring circumferentially around a neck portion of the cathode ray tube;

bonding the mounting collar to a back surface of the cathode ray tube; and placing a circuit board having an aperture therein circumferentially around the neck portion so that the circuit board, the mounting collar, and the neck portion are generally coaxially aligned; and fastening the circuit board to the mounting ring.

22. The method of claim 21 wherein bonding the mounting collar is with a resilient bonding material.

23. The method of claim 21 wherein the mounting collar has a flange portion and wherein fastening the circuit board is to the flange portion of the mounting collar.

* * * * *